(12) United States Patent
Hagen

(10) Patent No.: US 9,543,759 B2
(45) Date of Patent: Jan. 10, 2017

(54) ON-BOARD-UNIT FOR USE IN VEHICLE IDENTIFICATION

(75) Inventor: Anders Hagen, Hommelvik (NO)

(73) Assignee: Q-FREE ASA, Trondheim (NO)

( * ) Notice: Subject to any disclaimer, the term of this patent is extended or adjusted under 35 U.S.C. 154(b) by 513 days.

(21) Appl. No.: 14/118,424

(22) PCT Filed: Jun. 1, 2012

(86) PCT No.: PCT/NO2012/050103
§ 371 (c)(1),
(2), (4) Date: Nov. 18, 2013

(87) PCT Pub. No.: WO2012/165972
PCT Pub. Date: Dec. 6, 2012

(65) Prior Publication Data
US 2014/0103743 A1    Apr. 17, 2014

(30) Foreign Application Priority Data
Jun. 1, 2011 (NO) .................................... 20110800

(51) Int. Cl.
*H02J 1/00* (2006.01)
*G07B 15/06* (2011.01)
*H02N 2/18* (2006.01)

(52) U.S. Cl.
CPC ............... *H02J 1/00* (2013.01); *G07B 15/063* (2013.01); *H02N 2/186* (2013.01)

(58) Field of Classification Search
None
See application file for complete search history.

(56) References Cited

U.S. PATENT DOCUMENTS

| 2005/0134148 | A1 | 6/2005 | Buhler et al. |
| 2006/0176158 | A1* | 8/2006 | Fleming ............. B60R 16/0232 340/425.5 |
| 2008/0068180 | A1* | 3/2008 | Powell ................. G07B 15/063 340/572.8 |
| 2012/0181859 | A1 | 7/2012 | Nagy et al. |

FOREIGN PATENT DOCUMENTS

WO    0229965 A1    4/2002

OTHER PUBLICATIONS

International Search Report and Written Opinion dated Dec. 5, 2012 (PCT/NO2012/050103).

\* cited by examiner

*Primary Examiner* — Jared Fureman
*Assistant Examiner* — Aqeel Bukhari
(74) *Attorney, Agent, or Firm* — Alix, Yale & Ristas, LLP

(57) ABSTRACT

A system and method for automatic identification and recording of vehicles passing a road user charging point or location. A system and method for powering an on-board-unit (OBU) that can be mounted in a vehicle by including an energy harvester capable of providing at least a part of the energy required to operate the on-board-unit.

20 Claims, 1 Drawing Sheet

ON-BOARD-UNIT FOR USE IN VEHICLE IDENTIFICATION

BACKGROUND

The disclosure is related to vehicle identification in general and particularly to systems and methods for automatic identification and recording of vehicles passing a road user charging point or location. More particularly the disclosure is related to an on-board-unit (OBU) that can be mounted in a vehicle and provides a novel solution to the powering of such on-board-units.

Systems for road user charging have been in operation on many locations around the world. Due to increasing congestion of roads and highways and the associated environmental influences, there is an increased focus all over the world on trying to implement regulations that may reduce the amount of vehicle traffic. Levying road user charges is an option, and automated systems for easy and effective payment of road user charges are commercially available today and are also under continuous development.

One way of identifying a car that is passing a road charging point is by equipping the cars with on-board-units (OBUs), each OBU being uniquely associated with a car in which the OBU is mounted and capable of signaling its presence to an appropriate reader unit (RU) which is coupled to associated roadside equipment (RSE) for further preparation and processing of the communication signals.

In a system provided by the Norwegian company Q-Free ASA any car carrying a Q-Free badge will be automatically identified when passing a road charging point equipped with corresponding Q-Free reader unit (RU) and roadside equipment. The Q-Free system ensures correct payment, for example by debiting a prepaid customer account, each time a vehicle passes a road charging point. The badge/OBU includes a transponder that is capable of receiving a transmitted signal from the reader unit coupled to the roadside equipment and for providing a response signal from the transponder to the RU. The response uniquely identifies the vehicle. Early generations of the Q-Free system used passive transponders that could operate without electric batteries locally in the OBUs.

Present systems for road user charging (RUC) may use transponders based on Dedicated Short Range Communication (DSRC) operating at signal frequencies in the 5.8 MHz band. They may be adapted to satisfy the recommendations of the CEN/TC 278 standardization work. Such transponders are mounted in the vehicles and they are generally referred to as on-board-units or OBUs in this description.

Active on-board-units are typically powered by an electrical battery, for example in the form of a lithium primary cell (3.6 V, 350-900 mAh). In normal operation such a battery provides for a minimum lifetime of five years for the badge. The lifetime may however be limited strongly by the number of passages under a reading unit, as well as by the number of undesirable wake-up processes due to radio signals in the surroundings, for example radar antennae, WLAN-equipment etc.

Present active OBU's are faced with numerous limitations. For example, even though the energy supply units may operate for quite some time, they typically have to be replaced after some time.

Their lifetime is also limited due to a limited energy supply, necessitating frequent changes of batteries or even replacement of the OBUs themselves. Moreover, the lifetime depends also on external influences, such as how often the OBU's become activated by signals other than the radio beacon at a road user charging point (undesirable wake-up processes).

Thus there is a continuous effort to provide OBUs that operate in more power efficient manners, and to provide batteries with improved energy storage capacity while not increasing the weight and size of the OBUs.

On this background, there is a recognized need for OBUs with increased lifetime, to avoid unnecessary replacement of the batteries of the OBU's or the complete OBU itself.

SUMMARY

Provided herein is a novel OBU having increased lifetime and thus requiring less frequent or no replacements during the full operating life of the OBU. Such solutions will contribute to lower the amount of waste associated with battery replacements and make the OBU's more environmentally compatible, while at the same time reducing the total lifetime cost of road user charging systems.

Vehicle identification is often required in relation to systems for road user charging (RUC), congestion charging, collection of road tax, car registration or the like.

In an embodiment of an OBU according to the present disclosure, an energy harvester is included as a part of an energy supply unit for supplying the OBU with voltage/current levels required for operation.

In a further embodiment of an OBU according to the present disclosure, the energy harvester includes a resonant mechanical device in a material capable of generating electric power when subjected to mechanical influence (e.g. acceleration, rotation, bending, etc.), for example a piezoelectric device.

In yet a further embodiment of the disclosed OBU, the energy harvester includes a device capable of transforming mechanical energy or kinetic energy, for example from mechanical vibration, into electric energy.

Embodiments of the OBU exist wherein the energy harvester is coupled to an energy storage unit in the form of a chargeable device, for example a Lithium battery, or a capacitor.

According to another disclosed embodiment the mentioned energy harvester is arranged to provide power to an identification unit of the OBU which enables the OBU to provide information necessary to identify the OBU to roadside equipment in a road user charging system. The roadside equipment is coupled to a reader unit which is typically located above the passing vehicles.

The energy harvester increases the lifetime of an OBU having a chargeable battery, or as a supplementary source of energy in an OBU with a standard electric primary cell.

In some embodiments the OBU is arranged to operate without a battery as the energy harvester provides sufficient power under most normal operating conditions to be able to power the OBU alone.

According to another embodiment the energy harvester is combined with a capacitor for storing a small amount of energy. In this case, the OBU could achieve unlimited lifetime.

In yet another embodiment the energy harvester is a part of an energy supply unit which supplies the OBU with required voltages/currents required to power core components of the OBU.

In yet another embodiment of the OBU an energy storage unit is coupled to the energy harvester for storage of at least some of the energy provided by the energy harvester. The energy storage unit preferably comprises a chargeable electric battery device.

According to another embodiment the OBU includes an electromechanical energy harvester, for example a piezo-electric-device-based energy harvester.

Embodiments of the OBU exist which include an electromagnetic energy harvester based on a conductor moving in relation to a magnetic field in response to an external mechanical influence.

Further embodiments of the OBU include an electrostatic energy harvester based on a capacitance changing as a result of at least one electrode or a portion of a dielectric material moving in relation to other capacitance parts in response to an external mechanical influence.

Still further embodiments of the OBU include an energy harvester based on a mechanically resonant device having a resonance frequency within the range of 5-30 Hz.

Further preferable features and advantageous details of the invention will appear from the following example description.

BRIEF DESCRIPTION OF THE DRAWINGS

The on-board-unit according to the invention will now be described in more detail with reference to the appended figures, where.

DETAILED DESCRIPTION

Figure 1:
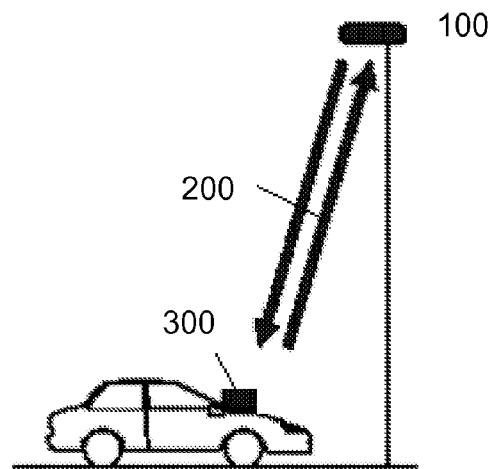
FIG. 1 illustrates the main principle of arranging an OBU in a vehicle for communicating with an reader unit in a road user charging system.

Reference is now made to FIG. 1 which illustrates the basic principle of arranging an onboard-unit (OBU) 10 in a vehicle for communicating, via a communication link 200 with a reader unit (RU) of roadside equipment (RSE) 100 in a road user charging system. The interaction of the OBU 10 serves to identify a vehicle passing the RU which is equipped to communicate with the OBU 10 and identify the passing vehicle based on information received from the OBU 10.

A signal is transmitted from the RSE 100 towards passing vehicles. When a vehicle with an OBU 10 is in the vicinity of the RSE 100 the OBE 10 picks up the transmitted signal and generates a suitable response signal that is transmitted from the OBU 10 to the RSE 100. The OBU 10 generates a response signal comprising information, for example in the form of digital code, which can be used by the RSE 100 to identify the passing vehicle based on pre-stored information linking each OBU digital code in use with a vehicle and its owner, and to effect payment of a road user charge relevant for the vehicle in question, the payment being effected, for example, according to an agreement between the owner of the vehicle in question and the operator of a road user charging system.

The OBU 10, in a preferable embodiment, is provided with an identification module including a code carrier, whereby the identification module is arranged to provide a code taken from a code carrier to a signal generator which generates the response signal from the OBU 10 to the RSE 100. The code carrier may be programmed uniquely with a unique identification code for each individual OBU 10. One example of the design of such OBUs 10 may be found in published International Patent Application Publication No. WO 94/03982.

The OBU 10 may, for example, be mounted on the inside of a windshield, i.e. windscreen, of the vehicle, typically on the part of the windshield behind a rear-view mirror, as seen from the driver's position. In vehicles with metallized windshields there is normally provided a non-metallized area for mounting an OBU 10 or the like for allowing communication with devices outside the vehicle. The OBU 10 may also be mounted on the inside of body components, such as non-shielding, for example non-metallic, body components.

Figure 2:
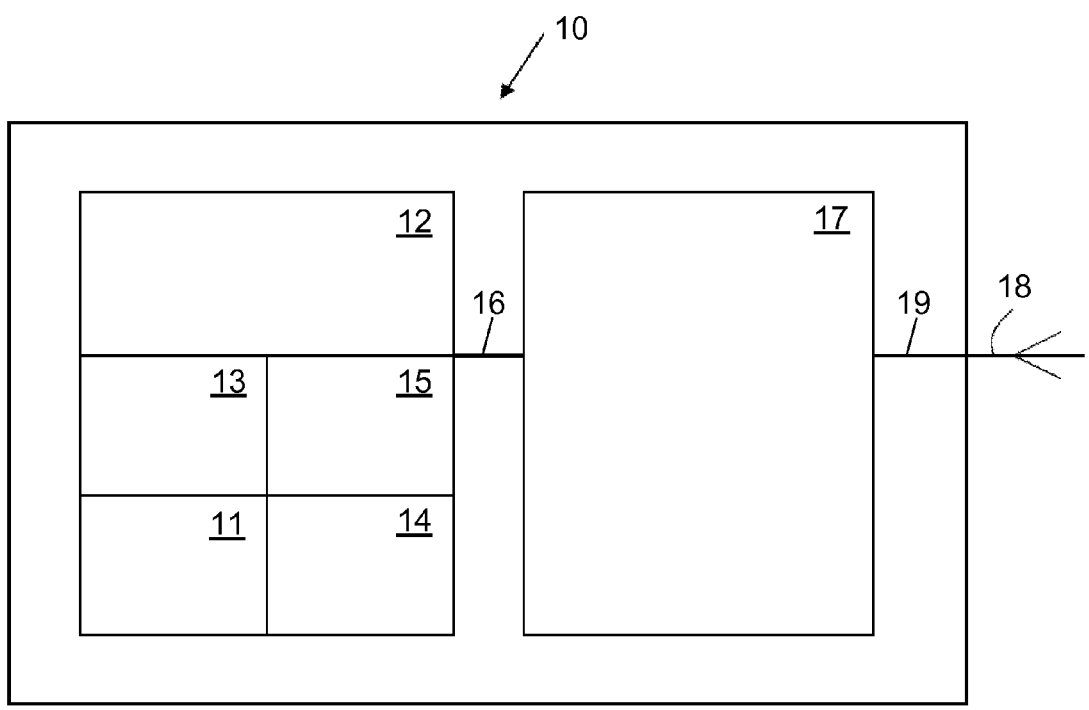
FIG. 2 illustrates in detail an embodiment of an OBU according to the invention.

Reference is now made to FIG. 2 which illustrates an OBU 10 that is provided with an energy harvester 11. The energy harvester 11 is typically coupled with an OBU power unit 12 preferably via an impedance and voltage matching module 13. The energy harvester 11 also cooperates with an energy storage unit 14, possibly via a power management module 15.

The energy harvester 11 and energy storage unit 14 may be part of the OBU Power Unit 12. The OBU power unit 12 is connected via a first link 16 to main components 17 of the OBU, for supplying the required electric power to other main components of the OBU 10. The main components 17 of the OBU take care of the functions of the OBU 10 as can be understood from FIG. 1, such as communication and information exchange with the RSE 100.

When using radio communication the OBU 10 typically includes an antenna 18 which is connected via a second link 19 to the OBU main components 17. The communication between the OBU 10 and the RSE 100 could, for example, be performed as described in published International Patent Application Publication No. WO 01/59947.

The energy harvester 11 is a device capable of transforming energy, for example mechanical or kinetic energy in the form of vibration energy, rotational energy, or impulse energy into electric energy, for example, a device based on the same principles as described in U.S. Pat. No. 7,057,330 may be used.

Energy harvesters are commercially available and are said to be able to convert low-level vibrations into usable energy, for examples is referred to a device described in the product data sheet nr 01/04, titled "Energy Harvester", from Ferro-Solutions, Inc., dated 2004, and a device described in http://www.ferrosi.com/files/FS_product_sheet_wint04.pdf, which is claimed to be the first products to generate power in the milliwatt (mW) range.

An example of a piezoelectric energy harvester is described in the article "A Free-Standing, Thick-Film Piezo-electric Energy Harvester", by S. L. Kok et al, unknown publishing date.

Other types of energy harvesters may be also be used, such as solar cells for capturing solar energy, or devices based on thermal energy, wind energy or other types of energy. The energy harvesters may be based on harvesting energy from ambient vibrations, heat or light. Other types of devices harvesting kinetic energy may also be used. The OBU 10 may for example include an electromagnetic energy harvester based on a conductor moving in relation to a magnetic field, the movement of the conductor being in response to an external mechanical influence.

The OBU 10 may also comprise an electrostatic energy harvester based on a capacitance which is changing as a result of electrodes moving with respect to each other, or that a portion of a dielectric material is moving in relation the electrodes as a response to an external mechanical influence.

Electrostatic based energy harvesters have previously been described, for example in the article "Electrostatic Energy Harvester and Li-Ion Charger Circuit for Micro-Scale Applications", by E. O. Torres et al, unknown publishing date.

Three-dimensional (x, y, z-plane) measurements of the acceleration as experienced during normal driving conditions in typical vehicles has been performed. The measured data have been logged and subsequently processed to provide estimates of the power spectra of the acceleration.

The results show that there are characteristic frequencies/frequency bands that have a relatively larger power density than other frequencies in typical automobiles. So, in some embodiments of the OBU 10 a resonant energy harvester 11 is included which has a resonance peak tuned to one such frequency band. The energy harvester 11 can be tuned to have a resonance frequency at or close to a typical engine or wheel vibration frequency.

Preferably, the energy harvester 11 includes a resonant device having a resonance peak in the frequency range of 5-30 Hz, or more particularly in the frequency range of 5-15 Hz or 15-30 Hz, even more preferably within the range of 12-18 Hz, and still more preferably in the range 14-16 Hz.

The energy harvester 11 is thus preferably configured as a resonant mechanical device in a material capable of generating electric power when subjected to mechanical influence (e.g. bending). Although a single resonance device is the simplest device to use, multiple resonance devices can equally well be used, particularly to harvest energy from multiple frequency bands. Piezoelectric materials have this property and are possible solutions. The electromechanical resonant device may also be based on a conductor movable in a magnetic field, and a capacitance in which the distance between the electrodes is changing as a result of external influence.

More generally, the impulses experienced at acceleration, retardation, or when passing humps or other types of road irregularities may provide sufficient kinetic energy to the OBU 10 to set a resonant device of an energy harvester 11 in oscillation, thereby enabling harvesting of energy by the OBU 10.

An OBU 10 may be operated continuously during normal vehicle driving conditions with as little power as about 10 microwatt (ON) and it may be operated with a power of about 10 milliwatt (mW) in the few tens of milliseconds required to perform a communication with the U to effect a road user charging payment transaction. It is now fully feasible to power the OBUs 10 by commercially available energy harvesters, particularly if the energy harvester 11 is based on a resonant device capable of resonant vibration in the above frequency ranges. It has been found that there are now energy harvesters available which are capable of delivering the required energy for continuous operation of OBUs 10 over long periods, and that, if the energy harvester 11 is combined with an energy storage unit 14, continuous operation of the OBUs 10 is possible.

While the above mentioned measurement results have been taken and analyzed, it has subsequently been possible to obtain energy harvester devices having the required design parameters for being resonant within the above frequency ranges from commercial producers of such components, the frequencies being preferable for OBUs 10 mounted at the typical locations in a vehicle. Thus, a self-powered OBU 10 is obtained which needs no replacements of an electric battery whenever the battery has been emptied.

In summary, providing an OBU 10 with an energy harvester 11 results in an OBU 10 with increased lifetime, and whose lifetime is not so dependent on external undesired radio signal waking up the OBU 10 to operate. This reduces the dependence on replacing battery cells at regular intervals.

The invention claimed is:

1. An on-board unit (10) for automatic identification of a vehicle on a road user charging system, the on-board unit (10) including an identification module and a power unit (12), energy storage unit (14) being a capacitive device, power management unit (15), main components (17), and an antenna (18) for communication with a reader unit of roadside equipment (100) proximate a road in a road charging system, comprising an energy harvester (11) connected to the power unit (12) via an impedance and voltage matching module (13), the energy harvester (11) comprising at least one tunable resonant mechanical device in a material capable of generating electrical power when subjected to mechanical influence and being configured for providing at least a portion of energy required to operate the antenna (18) and main components (17) of the on-board-unit (10) for communication with the reader unit of roadside equipment (100).

2. The on-board unit according to claim 1, wherein the energy harvester (11) is a part of an energy supply unit (12) for supplying the on-board-unit (10) with voltage and current levels required for operation.

3. The on-board unit according to claim 1, wherein the energy harvester (11) includes a device configured for transforming vibration energy into electric energy.

4. The on-board unit according to claim 1, wherein the energy storage unit (14) is coupled to the energy harvester (11) for storing harvested energy.

5. The on-board unit according to claim 2, wherein the energy storage unit (14) is coupled to the energy harvester (11) for storing harvested energy.

6. The on-board unit according to claim 1, wherein the energy harvester (11) is coupled to the energy storage unit (14) in the form of a chargeable device.

7. The on-board unit according to claim 1, wherein the energy harvester (11) is electromagnetic based on a conductor moving in relation to a magnetic field in response to an external mechanical influence.

8. The on-board unit according to claim 2, wherein the energy harvester (11) is electromagnetic based on a conductor moving in relation to a magnetic field in response to an external mechanical influence.

9. The on-board unit according to claim 6, wherein the energy harvester (11) is electromagnetic based on a conductor moving in relation to a magnetic field in response to an external mechanical influence.

10. The on-board unit according to claim 1, wherein the energy harvester (11) is electrostatic based on a capacitance changing as a result of at least one electrode or a portion of a dielectric material moving in relation to other capacitance parts in response to an external mechanical influence.

11. The on-board unit according to claim 6, wherein the energy harvester (11) is electrostatic based on a capacitance changing as a result of at least one electrode or a portion of a dielectric material moving in relation to other capacitance parts in response to an external mechanical influence.

12. The on-board unit according to claim 1, wherein the at least one mechanically resonant device has a resonance frequency within the range of 5-30 Hz.

13. The on-board unit according to claim 6, wherein the at least one mechanically resonant device has a resonance frequency within the range of 5-30 Hz.

14. The on-board unit according to claim 1, wherein the energy harvester (11) includes multiple tunable resonant mechanical devices.

15. The on-board unit according to claim 14, wherein the tunable resonant mechanical devices are tuned to have resonance peaks within the frequency range of 5-30 Hz.

16. The on-board unit according to claim 1, wherein the at least one tunable resonant mechanical device is tuned to harvest energy from different frequency ranges.

17. The on-board unit according to claim 1, wherein the at least one tunable resonant mechanical device is tuned to a resonance an approximate frequency of vibration of an engine or wheel.

18. The on-board unit according to claim 1, wherein the at least one tunable resonant mechanical device is a piezoelectric device.

19. The on-board unit according to claim 1, wherein the at least one tunable resonant mechanical device is a conductor that moves in relation to a magnetic field in response to an external mechanical influence.

20. The on-board unit according to claim 1, wherein the at least one tunable resonant mechanical device changes capacitance as a result of at least one electrode or a portion of a dielectric material moving in relation to other capacitance parts in response to an external mechanical influence.

\* \* \* \* \*